W. H. KROLL.
SIGNAL FOR AUTOMOBILES.
APPLICATION FILED OCT. 11, 1920.
1,428,104.
Patented Sept. 5, 1922.
2 SHEETS—SHEET 1.
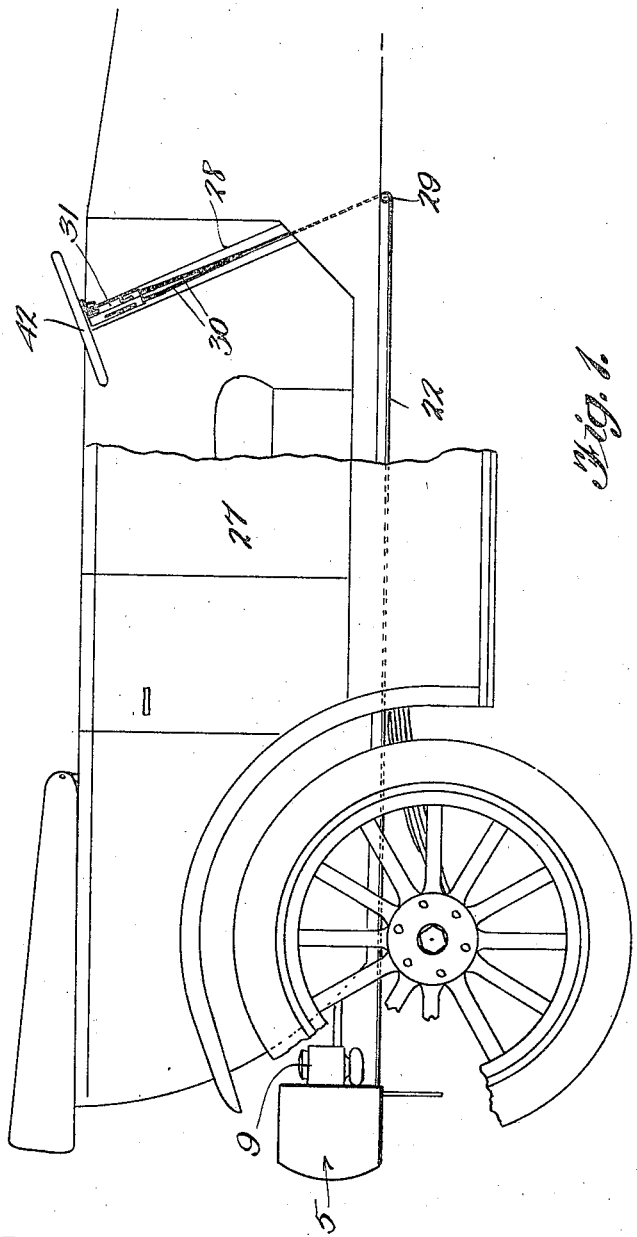
WITNESSES.
WILLIAM H. KROLL, INVENTOR.
BY
ATTORNEY.

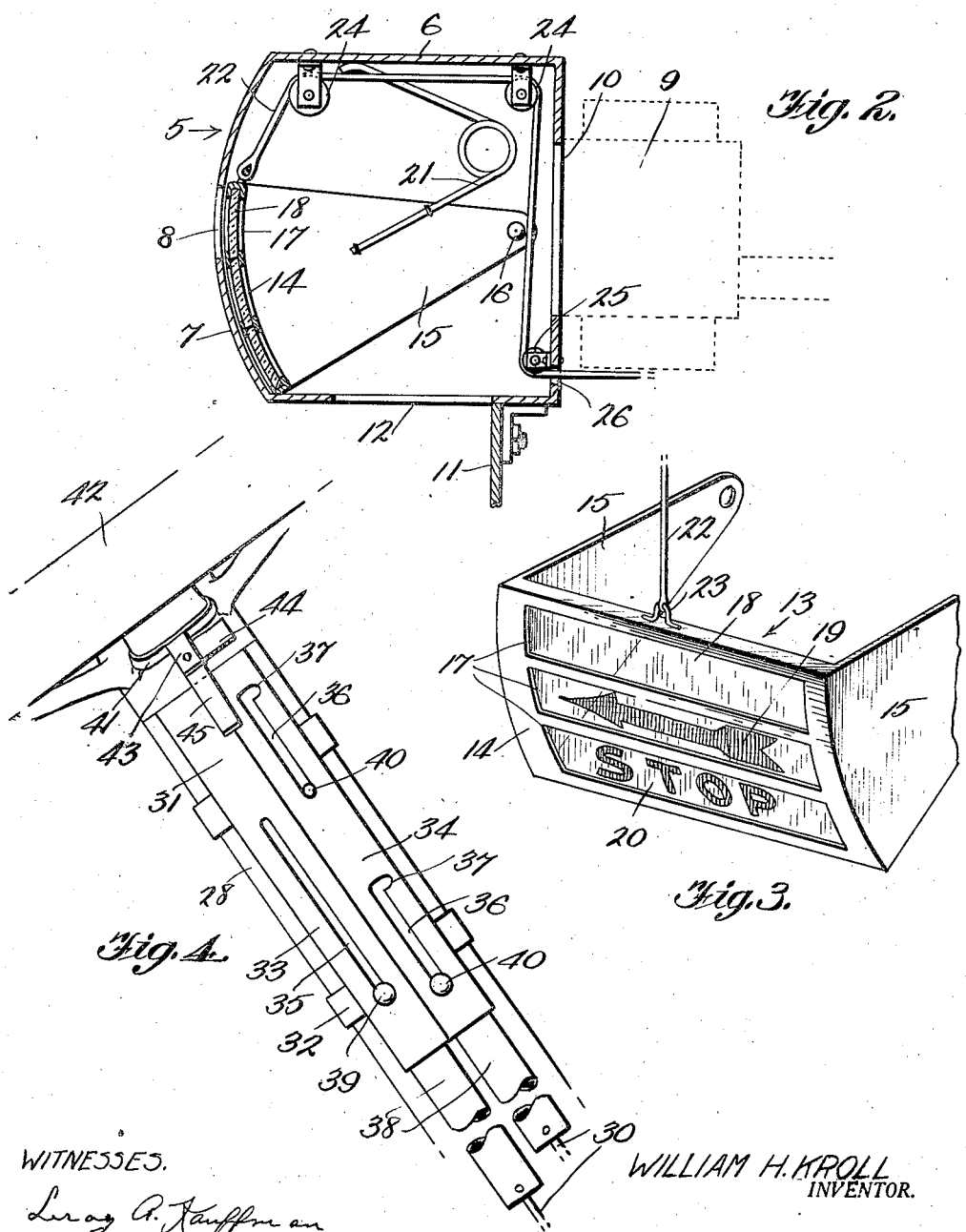

Patented Sept. 5, 1922.

1,428,104

UNITED STATES PATENT OFFICE.

WILLIAM H. KROLL, OF BOWLER, WISCONSIN.

SIGNAL FOR AUTOMOBILES.

Application filed October 11, 1920. Serial No. 416,056.

*To all whom it may concern:*

Be it known that I, WILLIAM H. KROLL, a citizen of the United States, residing at Bowler, in the county of Shawano and State of Wisconsin, have invented certain new and useful Improvements in Signals for Automobiles, of which the following is a specification.

This invention relates to new and useful improvements in signals for automobiles and more particularly to that type carried by a vehicle and adapted to indicate a contemplated movement of the automobile, the primary object of the invention being to provide a movable indicator member containing indicia whereby any one of the indicia may be displayed at the will of the driver.

Another object of the invention is to provide a device of this nature including means whereby a signal may be operated to indicate the turning movement of the automobile to which it is attached and retained in such position until the automobile has completed the turn, at which time, automatic means will return the indicating member to its normal unseen position.

A further object of the invention is to provide a signal of the above mentioned character including manually operated means for displaying various indicia and means whereby the signalling means is returned to its normal position when the manually operated means are released by the driver.

Other objects and advantages of the invention will become apparent during the course of the following description.

In the accompanying drawings forming a part of the invention wherein like numerals are employed to designate like parts throughout the several views—

Figure 1 is a side elevation of the invention attached to an automobile.

Figure 2 is a vertical section of the signal means.

Figure 3 is a perspective view of the indicator member, and

Figure 4 is a side elevation of the operating means applied to the stearing apparatus of the automobile.

Referring now to the drawings wherein for the purpose of illustration is shown the preferred embodiment of my invention, the numeral 5 designates the signalling means in its entirety and comprises a substantially square casing 6 having its rear end 7 convexed outwardly and provided with a horizontal elongated slot 8 through which various signals may be seen. This casing is preferably an illuminated one and may be attached to any part of the automobile which proves desirable. However, in the present instance I have shown the casing secured to an ordinary tail light 9 and have removed a portion 10 of the forward end of the casing to align with the light opening in the tail light 9 whereby the casing may be properly illuminated at night. When the casing is associated with such tail light, the red lens in the tail light may be removed to permit natural light to be passed into the casing. However, if it is not desired to use the casing in conjunction with a tail light, the rear end of the casing may be closed and a source of light placed directly in the casing so as to shed light through the opening 8. A license tag 11 may be secured to the bottom of the signal box in any desired manner and the bottom of the signal box is provided with an opening 12 whereby light may be shed upon the tag.

In order to display different signals through the opening 8 of the casing, a vertically movable indicator member 13 is mounted within the casing 6. This member consists of an arcuated outwardly convexed plate 14 adapted to be arranged in close proximity to the inner surface of the casing end 7 and assumes approximately the same configuration thereof. The plate 14 is provided at each end with an arm 15 which extends forwardly of the signal box and which arms are arranged in spaced parallel relation. The indicator member is about the same width as the interior of the box and the arms 16 are pivotally connected at their free ends to opposite sides of the signal casing by means of rivets 16 or other suitable means. It will be noted that the arms 15 are of segmental shape and that the pivots thereof are arranged in approximately the same horizontal plane as the opening 8 for a purpose which will presently appear.

The plate 14 of the indicator, is provided with a plurality of elongated slots or openings 17 which are arranged in vertical alignment, whereby any one of the slots may be brought into alignment with the opening 8 in the rear end of the signal box. The normal position of the indicator member is in contact with the bottom of the signal casing, whereby the uppermost slot 17 is normally in alignment with the opening 8 of the casing. This slot 17 has a red lens 18 associated therewith so that the signal when the indicator member is arranged in its normal position will be that of the ordinary tail light. A second or intermediate slot 17 is equipped with a white glass having a red and green transparent arrow 19 therein and when displayed indicates that the automobile contemplates a left hand turn. The lowermost slot 17 is provided with a white glass 20 having transparent red letters therein which form the word "Stop." In order that the indicator member will be normally retained in engagement with the bottom of the signal box so that the uppermost indicia may be displayed, a spring 21 having its intermediate portion provided with a coiled portion has one arm secured to the inner surface of one arm 16 of the indicator member, while the other arm of the spring has its free end arcuated to slidably engage with the top of the signal box. A similar spring is of course provided for the other arm of the indicator member whereby it will be properly returned to its normal position.

A means for operating the indicator means consists of a flexible element 22 such as a cable having one end secured to the upper end of the plate 14 by means of engagement with a loop 23 carried by this plate. A cable from the indicator member extends vertically to ride over a pair of spaced pulleys 24 suspended from the top of the signal box whereby the cable is retained in proximity thereto and in a position so as not to interfere with the movable parts of the signal. From these pulleys, the cable extends vertically in proximity of the signal box to engage with a pulley 25 mounted adjacent the bottom of the rear end so as to direct the cable through an opening 26 and toward the forward end of an automobile 27. The cable extends forwardly to the base of the steering column 28 and engages a pulley 29 to be directed up through the floor of the automobile and alongside the steering column. As clearly shown in Figures 1 and 4 this end of the cable is provided with a pair of branch wires or cables 30 for a purpose which will presently appear.

The means for manually controlling the operation of the signal consists of a casing in the form of a pair of sleeves 31 secured side by side and to one side of the steering column by means of straps or clamps 32. For the purpose of distinction we will term one of the sleeves as the "stop" sleeve 33 and the other as the "turn" sleeve 34. The "stop" sleeve is provided with an elongated slot 35 while the "turn" sleeve is provided with a pair of longitudinally extending slots of equal dimension, the upper end of which are each provided with an angularly extending slot or extension 37. The object of having two slots is that the upper slot will be arranged adjacent the trip mechanism 45 and the other slot will be disposed in proximity to the slot 35, whereby the operating elements 39 and 40 respectively will be situated closely together for convenience of the operator.

A cylindrical member 38 is slidably mounted in each sleeve and the lower end of each normally projects beyond the lower end of casing 31 and are connected to the branch cables 30. The member 38 which is mounted for reciprocation in the stop sleeve is provided with a projecting part 39 which extends through the slot 35 and is normally disposed in the lower end thereof so that when the parts or knob is moved upwardly of its slot, the member 38 is moved in a similar manner which pulls the cable 22 and swings the indicator member 13 to a position to align the stop indicia carried thereby with the opening 8 in the signal box. As the cable is always retained under tension, the springs 21 connected to the indicator member together with the fact the members 38 will drop by gravity when released, it will be apparent that the indicator member will automatically return to its normal position.

The member 38 slidably mounted in the "turn" sleeve is provided with a pair of projecting parts 40 which extend through the slots 36. One of the parts 40 is provided with a knob whereby it may be gripped and moved vertically of its slot to cause the "turn" indicia of the indicator member to be displayed. In order to retain the "turn" indicia in displayed condition, the projecting part 40 is moved into the angular end 37 of its slot, and such movement will also place the other part 40 in the angular portion of its slot.

A clamp 41 is secured to the steering wheel 42 which is arranged above the manually controlled mechanism and is provided with a pair of apertured ears 43 between which is pivotally mounted a trip 44. This trip in the present instance assumes the form of an angle lever pivoted at the angle thereof and has its short arm extending forwardly of the automobile, while the longer arm 45 of the trip depends and is arranged in proximity to the upper end of the upper slot 36 with the turn sleeve 34. This arrangement is provided so that when the steering wheel is actuated to cause the vehicle to turn to the left, the long arm 45 of the trip will pass over the projecting part 40 in the slot of the turn sleeve and will not effect the same. However, after the automobile has made the desired turn and the steering wheel is turned to a position to guide the automobile in a straight or forward course, the arm 45 of the trip engages the projecting part 40 and due to the short arm of the trip engaging the clamp 41 will move the projecting part 40 out of the angular end of the slot and due to the force of gravity the member 38 mounted in the turn sleeve 34 will drop by gravity to permit the indicator member to return to its normal position.

The foregoing description and the accompanying drawings have reference to the preferred or approved embodiment of my invention. It is to be understood however that such changes may be made in construction and arrangement of parts, materials, dimensions, etc. as may prove expedient and fall within the scope of the appended claim.

Having thus fully described my invention what I claim as new and desire to secure by Letters Patent is:—

An actuating device for an automobile indicating member, comprising a pair of sleeves having slots of different length therein, one of said sleeves having its slots provided at their upper ends with bayonet slots whereby the actuating member is held in operative position, an operating member slidably mounted in each and having a part engaging its respective slot, and means to release the actuating member.

In testimony whereof I affix my signature in presence of two witnesses.

WILLIAM H. KROLL.

Witnesses:
 JOHN MILLER,
 JOE BOEHM.